United States Patent [19]

Hung

[11] Patent Number: 4,887,899

[45] Date of Patent: Dec. 19, 1989

[54] APPARATUS AND METHOD FOR ELECTRONIC ANALYSIS OF TEST OBJECTS

[76] Inventor: Yau Y. Hung, 625 Cambridge Dr., Rochester, Mich. 48063

[21] Appl. No.: 129,709

[22] Filed: Dec. 7, 1987

[51] Int. Cl.$^4$ .......................... G01L 1/24; G01B 9/02
[52] U.S. Cl. ................................. 356/35.5; 356/353
[58] Field of Search ................. 356/35.5, 33, 32, 353, 356/365, 369

[56] References Cited

U.S. PATENT DOCUMENTS

| | | | |
|---|---|---|---|
| 3,218,916 | 11/1965 | Saunders | 356/353 |
| 3,373,652 | 3/1968 | Flader | 356/33 |
| 3,487,227 | 12/1969 | Kinzly | 250/237 R |
| 3,532,431 | 10/1970 | Bryngdahl | 356/353 |
| 3,626,753 | 12/1971 | Aprahamian | 356/32 |
| 3,767,308 | 10/1973 | Duffy | 356/32 |
| 3,816,649 | 6/1974 | Butters | 350/3.5 |
| 3,828,126 | 8/1974 | Ramsey, Jr. | 356/32 |
| 3,829,219 | 8/1974 | Wyant | 356/353 |
| 3,849,003 | 11/1974 | Velzel | 356/353 |
| 3,911,729 | 10/1975 | Collins | 350/3.5 |
| 4,118,124 | 10/1978 | Matsuda | 356/353 |
| 4,125,314 | 11/1978 | Haskell | 350/3.5 |
| 4,139,302 | 2/1979 | Hung | 356/32 |
| 4,425,039 | 1/1984 | Grant | 356/35.5 |
| 4,427,295 | 1/1984 | Nishiyama | 356/369 |
| 4,523,469 | 6/1985 | Scott | 73/603 |
| 4,541,280 | 9/1985 | Cielo | 73/603 |
| 4,620,223 | 10/1986 | Haskell | 358/107 |
| 4,633,715 | 1/1987 | Monchalin | 73/657 |
| 4,650,302 | 3/1987 | Grant | 351/206 |
| 4,682,892 | 7/1987 | Chawla | 356/35.5 |
| 4,690,552 | 9/1987 | Grant | 356/353 |
| 4,702,594 | 10/1987 | Grant | 356/35.5 |

FOREIGN PATENT DOCUMENTS 231401 10/1985 Japan ..................... 356/353

OTHER PUBLICATIONS

Mallick et al, "Spatial Differentiation by a Lateral Shear Interferometer", *Applied Optics*, vol. 11, No. 2, (Feb. 1972) pp. 479–480.

Hariharan, "Speckle-Shearing Interferometry: A Simple System", *Applied Optics*, vol. 14, No. 11, (Nov. 1975) p. 2563.

Celaya et al, "Incoherent Processor for Restoring Images Degraded by a Linear Smear", *Applied Optics*, vol. 17, No. 14, (15 Jul. 1978) pp. 2191–2197.

(List continued on next page.)

Primary Examiner—Richard A. Rosenberger
Attorney, Agent, or Firm—William H. Eilberg

[57] ABSTRACT

A test object is analyzed electronically, i.e. without the use of photographic film. The invention generates a pair of laterally-displaced images of the object which interfere with each other to produce a pattern that can be recorded without a high-resolution detector. The object is illuminated with at least partially coherent light. Reflected light from the object is directed through a birefringent material, a lens system, a polarizer, and then to an image detector, such as a video camera. The birefringent material causes non-parallel beams originating from a unique pair of points on the object to become nearly parallel, and orthogonally polarized. The polarizer modifies the polarization of the parallel beams so that they will interfere with each other. Because the interfering light beams are nearly parallel, the spatial frequency of the interference pattern is sufficiently low that the pattern can be recorded by a low-resolution detector, such as a video camera. Interference patterns due to the superposition of two laterally-displaced images of the same object are recorded while the object is in an undeformed and a deformed state. A computer compares these interference patterns and produces a resultant pattern which depicts the deformation of the test object. Because photographic film is not needed, the invention can analyze objects very rapidly. Also, since the interference pattern is derived from pairs of distinct points on the object, the invention directly provides information on strain.

19 Claims, 5 Drawing Sheets

OTHER PUBLICATIONS

Hung et al, "Image-Shearing Camera for Direct Measurement of Surface Strains", *Applied Optics*, vol. 18, No. 7, (1 Apr. 1979) pp. 1046–1051.

Murty et al, "Liquid Crystal Wedge as a Polarizing Element and Its Use in Shearing Interferometry", *Optical Engineering*, vol. 19, No. 1, (Jan./Feb. 1980) pp. 113–115.

Kwon, O.; "Infrared Lateral Shearing Interferometers", *Applied Optics*, vol. 19, No. 8 (15 Apr. 1980) pp. 1225–1227.

Nakadate et al, "Digital Speckle-Pattern Shearing Interferometry", Applied Optics, vol. 19, No. 24, 12/15/80, pp. 4241–4246.

Hung et al, "Speckle-Shearing Interferometric Technique: a Full-Field Strain Gauge", in *Applied Optics*, vol. 14, No. 3, Mar., 1975, pp. 618–622.

Hung et al, "Measurment of Slopes of Structural Deflections by Speckle-Shearing Interferometry", in *Experimental Mechanics*, vol. 14, No. 7, 7/74.

Balas, "Some Applications of Experimental Analysis of Models and Structures", in *Experimental Mechanics*, Mar., 1967, pp. 127–139.

Hung, "Shearography: A New Optical Method for Strain Measurement and Non-Destructive Testing" Optical Engineering, May/Jun. 1982, p. 391.

"Laser Polarizers", in The Optical Industry and Systems Purchasing Directory (1982).

APPARATUS AND METHOD FOR ELECTRONIC ANALYSIS OF TEST OBJECTS

BACKGROUND OF THE INVENTION

This invention comprises a method and apparatus for nondestructively analyzing a test object. The invention is especially useful for detecting minute defects in manufactured parts. Defects in objects usually induce strain anomalies which can be identified from the fringe patterns produced by this invention. The invention may also be used for other purposes. For example, the invention comprises an ultra-sensitive, whole-field strain gauge, which permits strain distribution of a large area to be measured without the need for conventional gauges or transducers.

One method, known in the prior art, for analyzing a test object is "shearography". According to this method, two laterally-displaced images of the object are made to interfere to form a pattern of fringes. The pattern is random, and depends on the characteristics of the surface of the object. When the object is deformed, by temperature, pressure, or other means, the random interference pattern will change. The amount of the change depends on the soundness of the object. A comparison of the fringe patterns for the deformed and undeformed states gives information about the structural integrity of the object. The method is called shearography because the one image of the object is laterally-displaced, or sheared, relative to the other image.

An example of a method for practicing the technique of shearography appears in U.S. Pat. No. 4,139,302, the disclosure of which is incorporated by reference herein. In the latter patent, the shearing is accomplished by placing a wedge-shaped prism along a portion of a lens. The light beams which pass through the prism are displaced relative to the beams which do not pass through the prism. Thus, the lens and wedge system produces two laterally-displaced images of the object.

The main disadvantage of methods for shearography of the prior art is the high spatial frequency of the patterns produced. Spatial frequency means the number of fringe lines per unit length. When the spatial frequency is too high, it is necessary to record the interference pattern on high-resolution photographic film. It will be shown later that the spatial frequency of a fringe pattern is given by $$f = (2 \sin(\alpha/2))/\lambda$$

where
- $\alpha$ = the angle made by two interfering rays, and
- $\lambda$ = the wavelength of the light.

Because $\lambda$ is normally very small compared with the value of $\alpha$, the spatial frequency can become quite large. For example, if $\alpha = 20°$, and if $\lambda = 0.5$ microns, then the spatial frequency is about 700 lines per millimeter. It is not possible to view patterns having such fine detail with a video camera; instead, one must use a high-resolution photographic film.

In some cases, one might try to reduce the spatial frequency by reducing $\alpha$, such as by increasing the distance between the lens and the image. But the latter procedure would have the effect of greatly magnifying the image, and is therefore, at best, unwieldy, and, at worst, virtually unworkable. When the image and lens are moved far apart from each other, the image becomes so large that a video camera would need to scan the image almost point by point. Moreover, the overall intensity of the pattern would decrease, requiring a coherent light source of higher power. Also, in a wedge-shearing system, the interfering beams come from two halves of the lens, and thus the angle between the interfering beams is inherently large. Thus, the wedge-shearing technique inherently produces an interference pattern of high spatial frequency which is beyond the resolving capability of a video camera.

Another disadvantage of wedge-shearing technique is the need for optical filtering of the interference pattern. The high spatial frequency of the fringes produced by a wedge system makes the fringes very difficult to view with the naked eye. It therefore becomes necessary to provide an optical high-pass filter, which blocks out the low-frequency fringes, and which produces a pattern having visible dark bands corresponding to defective areas on the test object. Because it requires the use of photographic film, and because it also requires post-recording optical filtering, the wedge-shearing method is very cumbersome and slow when used for the inspection of objects. In general, it cannot fulfill the speed demands of a typical industrial production line.

Details of the high-pass optical filter used in the wedge-shearing technique are given in the article of Y. Y. Hung, entitled "Shearography: a New Optical Method for Strain Measurement and Nondestructive Testing", in Optical Engineering, May-June, 1982, vol. 21, No. 3, pages 391–395. The latter article is incorporated by reference herein.

One method of the prior art which avoids the problems due to excessively large spatial frequencies is the technique known as electronic speckle pattern interferometry (ESPI). An example of the latter technique is described in U.S. Pat. No. 3,816,649, the disclosure of which is also incorporated by reference herein. In ESPI, a beam of coherent light is directed onto the test object and reflected onto an image sensor. At the same time, a reference beam is also directed towards the sensor. The reference beam may be a "pure" beam or it may be reflected from a "reference" object. Both the object beam and the reference beam are nearly parallel, when they reach the image sensor, so the spatial frequency of the interference fringes is relatively low. Thus, the image sensor can be a video camera, or its equivalent.

While ESPI makes it possible to view an interference pattern directly with a video camera, it has important disadvantages. ESPI is similar to conventional holography, in that it requires an object beam and a reference beam of coherent light. The presence of two distinct beams increases the complexity of the optical system. The ratio of intensities of the object and reference beams must be carefully controlled, and the path lengths of the beams must be matched. Perhaps most importantly, ESPI, like holography, is very sensitive to vibration. The slightest movement of either the object or the apparatus for guiding the reference beam can ruin the pattern. Thus, ESPI requires special vibration isolation precautions, and is not practical for inspection of manufactured parts in a factory environment, or in the field.

Furthermore, ESPI measures absolute surface displacement, whereas the present invention measures relative displacement which is directly related to strains. Since defects in objects normally produce strain concentrations, it is easier to correlate defects with strain anomalies than with displacement anomalies.

The present invention overcomes the disadvantages of the prior art, described above, by providing a method and apparatus for analyzing a test object, without the need for photographic film, and using only one beam of light. With the present invention, the interference patterns can be recorded directly by a video camera, or other electronic image sensor, and processed by a computer, without intermediate developing and optical filtering steps. Thus, the invention can analyze objects at a video rate, i.e. up to about 30 frames per second. The output of the camera can be connected to a computer, which can store and analyze the data very rapidly. Thus, the invention is capable of inspecting objects at the rapid rate demanded by a typical production process.

Because only one beam is needed, the patterns obtained with the present invention are relatively insensitive to vibrations of the apparatus. The invention can therefore be used in typical production and field environments without special vibration isolation equipment. The single-beam process also eliminates the complex optical alignment problems associated with ESPI.

The present invention also provides means for measuring strains in a test object with extremely high precision. The invention can therefore be used as a whole field strain gauge, and is not limited to use in testing for defective objects.

The present invention also provides means for measuring the amplitude gradient in a steadily vibrating object. Measurement of gradients in the amplitude of vibration provides information on the maximum displacements of the vibrating object. The invention also provides means for measuring transient strains in an object.

SUMMARY OF THE INVENTION

The apparatus of the present invention includes a source of coherent, or partially coherent radiation, including, but not limited to, visible light, which is directed onto a test object. The light reflected from the object passes through an optical system which, in the preferred embodiment, includes a birefringent material, a lens, and a polarizer. After passing through the optical system, the light enters an image detector, which can be that of a video camera or equivalent photoelectric device. The image detector is connected to a computer, or its equivalent, which can store and analyze each frame of data.

The birefringent material produces a sheared image. The material, which can be a calcite crystal, separates an incoming beam into two distinct beams, polarized in mutually orthogonal directions, and which propagate through the material with different velocities. There exists a unique pair of points on the object, such that light beams reflected from these points become nearly parallel after passing through the birefringent material.

A lens focuses the light leaving the birefringent material onto an image plane. Before reaching the image plane, the light passes through the polarizer, which resolves the mutually orthogonally-polarized beams into components which are polarized in the same direction. The pairs of beams leaving the polarizer can thus interfere with each other, and they produce an interference pattern on the image plane.

Because the pairs of beams, originating from pairs of distinct points on the object, arrive at the image plane as nearly parallel beams, the spatial frequency of the interference pattern is relatively low, and the image detector need not be capable of extremely high resolution. The image detector can therefore be an ordinary video camera or equivalent device. The camera is connected to a computer for rapid analysis of the data.

In another embodiment, a quarter-wave plate is inserted between the birefringent material and the polarizer. The effect of this arrangement is to shift the phase of the resulting interference pattern. The amount of the phase shift is varied by adjusting the orientation of the polarizer. The ability to perform this phase shift allows the interference pattern, and thus the deformation in a test object, to be examined with great precision, and enables the invention to be used, for example, as an ultra-sensitive, whole-field strain gauge.

It is also possible to insert a narrow band pass optical filter, which admits only the coherent illumination, between the object and the birefringent material, thereby preventing virtually all ambient light from entering the image sensor, and allowing the invention to be used even in sunshine.

Another quarter-wave plate may be interposed between the object and the birefringent material, or between the band pass filter, if used, and the birefringent material, to insure that the light entering the birefringent material is circularly polarized. The latter polarization tends to equalize the amplitude of all beams transmitted by the birefringent material.

It is therefore an object of the present invention to provide a method and apparatus for nondestructive testing of objects.

It is another object to provide a testing method and apparatus which does not require the use of photographic film, and wherein the image detector can be a video camera, or equivalent device.

It is another object to provide a testing method and apparatus wherein a computer can be easily used to rapidly analyze the data.

It is another object of the invention to reduce the time nd expense required in the inspection of objects.

It is another object to provide a method for nondestructive testing wherein interference patterns are detected in "real time" by an image sensing device.

It is another object to provide a method and apparatus for nondestructive testing, wherein objects can be analyzed at a video rate.

It is another object to provide an apparatus as described above, wherein the apparatus does not require special vibration isolation.

It is another object to provide an apparatus and method for testing of articles, wherein only one light beam is required.

It is another object to provide a testing method which is sufficiently rapid to be used in a typical production process.

It is another object to provide a testing method and apparatus which is readily adapted for measuring differential anomalies in the test object.

It is another object to provide an apparatus and method for accurately measuring strains.

It is another object to provide an apparatus and method, as described above, wherein the phase of the interference pattern generated by the object can be adjusted, and wherein the interference pattern can be analyzed with great precision.

It is another object to provide an apparatus and method which can be used to analyze test articles in the field, or in a factory, where stray vibrations are present, and wherein the apparatus is negligibly affected by ambient light.

Other objects and advantages of the invention will be apparent to those skilled in the art, from a reading of the following brief description of the drawings, the detailed description of the invention, and the appended claims.

DETAILED DESCRIPTION OF THE INVENTION

The present invention is essentially a shearographic technique. That is, the invention generates two laterally-displaced images of the test object which interfere with each other to produce a fringe pattern. Comparison of two such patterns, for two distinct states of deformation, yields information on the condition of the surface of the object.

As explained above, shearographic techniques of the prior art require high-resolution photographic film because of the high spatial frequency, i.e. the number of fringes per unit length, of the interference pattern. The relationship between the spatial frequency, the angle between interfering beams, and the wavelength of the light is derived as follows.

Figure 1:
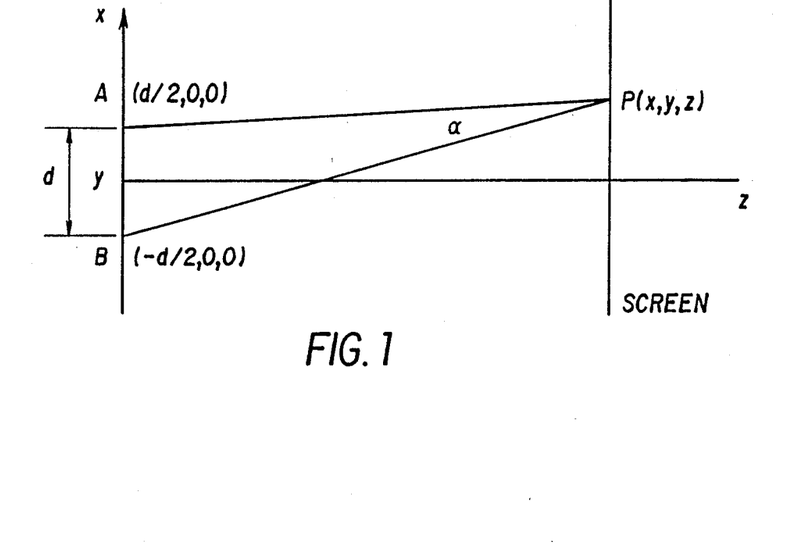
FIG. 1 is a diagram, used in the derivation of the equation for spatial frequency, showing two light beams, from point sources, interfering on a screen.

Consider the classical Young's experiment, involving the interference of light beams from two point sources A and B, illustrated in FIG. 1. A and B are separated by distance d. Assume that the beams from points A and B meet at a point P(x,y,z) on a distant screen. An interference pattern consisting of parallel fringes will be observed.

The interference pattern can be described by $$I = a^2(1 + \cos \theta) \quad (1)$$

where I is intensity, and a is the amplitude of the light. $\theta$ is related to the optical path difference by $$\sigma = \frac{2\pi}{\lambda}[PB - PA] \quad (2)$$

where $\lambda$ is the wavelength of the light, and $$PB^2 = \left[x - \left(\frac{-d}{2}\right)\right]^2 + (y-0)^2 + (z-0)^2$$

$$PA^2 = \left(x - \frac{d}{2}\right)^2 + (y-0)^2 + (z-0)^2$$

$$PB^2 - PA^2 = \left(x + \frac{d}{2}\right)^2 - \left(x - \frac{d}{2}\right)^2 = 2dx$$

Thus, $PB - PA = \frac{PB^2 - PA^2}{PB + PA} = \frac{2dx}{PB + PA}$

Using the approximation $\overline{PB} \approx \overline{PA}$, since the screen is assumed to be distant, we obtain $$\theta = \frac{2\pi}{\lambda}(PB - PA) = \frac{2\pi d}{\lambda PA} x \quad (3)$$

Dark fringes occur where $$1 + \cos \theta = 0$$

or $\theta = N\pi$, N = 1, 3, 5, ...

Thus, the difference, in $\theta$, between two adjacent dark fringes, is $2\pi$, so the spacing between two adjacent dark fringes at $x_1$ and $x_2$ is obtained from $$\theta_1 = \frac{2\pi d}{\lambda PA} x_1 = N_1 \pi$$

$$\theta_2 = \frac{2\pi d}{\lambda PA} x_2 = (N_1 + 2)\pi$$

Thus, $$x_2 - x_1 = \lambda \frac{PA}{d}$$

and the spatial frequency is given by $$f = \frac{1}{x_2 - x_1} = \frac{d}{\lambda PA} = \frac{2\left(\frac{d}{2PA}\right)}{\lambda} \quad (4)$$

If $PA \gg d$, then $$\frac{d}{2PA} \approx \sin \frac{\alpha}{2}$$

Thus, the spatial frequency of the fringe pattern is approximately $$f = \frac{2 \sin \frac{\alpha}{2}}{\lambda} \quad (5)$$

The essence of the present invention is therefore to produce an interference pattern wherein the effective value of $\alpha$ is sufficiently small that the spatial frequency given by Equation (5) is within the resolving power of a video camera or other, non-photographic sensor. The apparatus of the invention, in effect, creates two, laterally-displaced images of the object, the images being made to interfere with each other to form a fringe pattern having a reasonably low spatial frequency.

Figure 3:
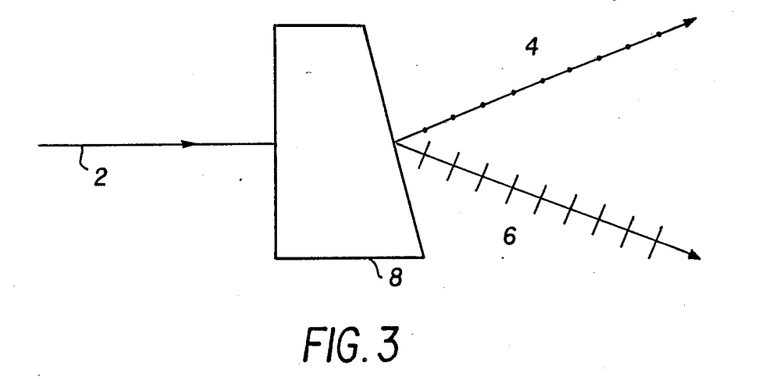
FIG. 3 is a schematic diagram illustrating the splitting of an incident beam into two beams, by a birefringent material.

The means of generating the shearing effect is preferably a birefringent material, such as a calcite crystal, or any other material or means which exhibits double refractivity. A birefringent material has two principal axes of transmission, which separate an incident light beam into two beams, having different velocities within the material. These beams are polarized in the mutually-orthogonal directions of the principal axes of the birefringent material, and are known as the ordinary beam and the extraordinary beam. The splitting of one beam into two is illustrated schematically in FIG. 3. FIG. 3 shows birefringent material 8, schematically symbolized by a trapezoid, and incident beam 2. The incident beam is split into ordinary beam 4 and extraordinary beam 6. The dots indicate the ordinary beam and the bars indicate the extraordinary beam. Thus, when light from an object passes through a birefringent material, two laterally-displaced images will be formed on an image plane.

More detailed information about birefringent materials, including calcite, is found in the article entitled "Laser Polarizers", in The Optical Industry and Systems Purchasing Directory (1982). The latter article is incorporated by reference herein.

For purposes of understanding the present invention, it is helpful to view the transmission of light through a birefringent material in another way. The passage of light rays through an optical system is reversible; one can rename the incident beam as the transmitted beam, and vice versa. Since a birefringent material separates one beam into two distinct, non-parallel beams, it is also true that there are two unique beams which, after passing through the birefringent material, become parallel. This phenomenon is illustrated in the schematic diagram of FIG. 2.

Figure 2:
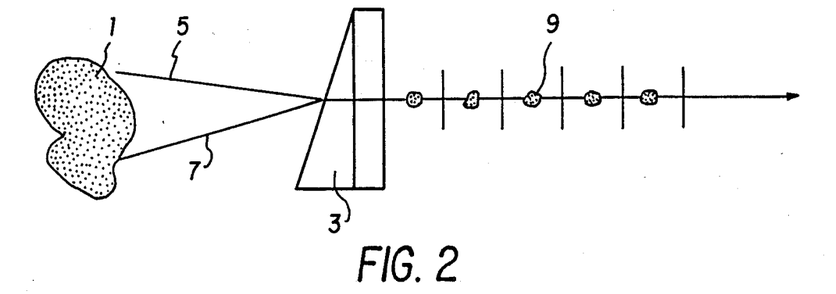
FIG. 2 is a schematic diagram illustrating the transmission of light beams, from two distinct points on a test object, through a birefringent material.

FIG. 2 shows object 1 and birefringent material 3. Light beams 5 and 7, originating from a source (not shown) of coherent, or partially coherent, light are reflected from the object, and enter the birefringent material. The transmitted beams substantially coincide, as illustrated by beam 9. These beams are polarized in mutually-orthogonal directions, and will therefore not interfere with each other.

There are two, and only two, points on the object, from which light beams will be reflected so as to produce a given pair of nearly parallel transmitted beams. Indeed, the entire object can be conceptualized as a set of unique pairs of points which give rise to pairs of nearly parallel beams. The qualifier "nearly" is used because, in practice, the light scattered from an object point travels in cones, not parallel beams, and, due to slight variations in the optical properties of the birefringent material resulting from varying angles of incidence, most of the pairs of beams leaving the material are not exactly parallel.

Figure 4:
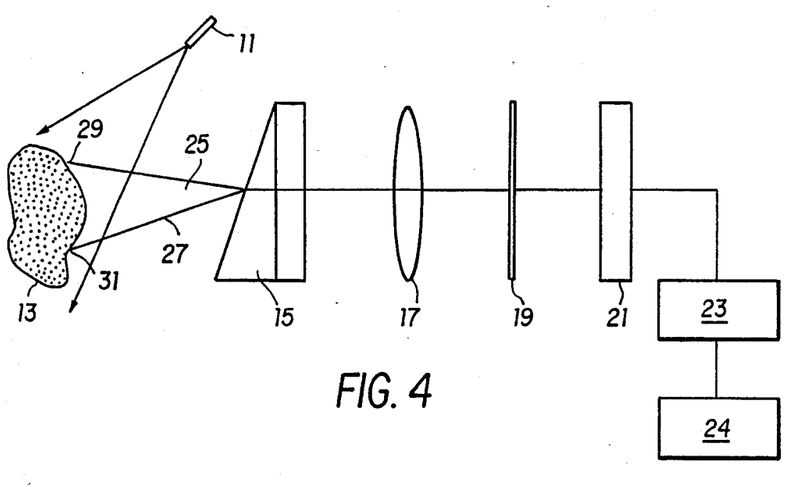
FIG. 4 is a schematic diagram of one embodiment of the present invention.

FIG. 4 is a schematic diagram of one embodiment of the present invention. Laser 11 illuminates object 13, and the light is reflected from the object. The surface of the object can be diffusely reflective or specularly reflective. The reflected light passes through an optical system which includes birefringent material 15, lens 17, and polarizer 19. The lens focuses the light onto the image plane of image sensor 21, which can be that of a video camera. The image sensor is connected to computer 23 for analysis of the data. The computer includes appropriate circuitry for recording, digitizing and processing the information in each image or frame. The computer is connected to a display device 24.

Reflected light beams 25 and 27, originating from distinct points 29 and 31 on the test object, pass through the birefringent material, and leave that material as nearly parallel, but orthogonally-polarized beams. Polarizer 19, whose polarization axis is oriented at 45° to the principal axes of the birefringent material, resolves each beam into a component which is polarized in a direction 45° away from the direction of original polarization. The result is a pair of parallel beams polarized in the same direction, though having a reduced amplitude. The parallel beams can therefore interfere, and will create an interference pattern on the image sensor. What is shown for two points and two beams occurs simultaneously for all the pairs of points on the object.

Because each point on the image plane receives light from two distinct points on the object, the interference pattern is equivalent to the superpositon of two laterally-displaced, or sheared, images of the test object.

The invention is not limited to use with visible light. The invention can be practiced with infrared or ultraviolet radiation, or even X-rays. The invention requires only the use of some kind of radiation which is capable of interference. It is therefore understood that, in this specification, the term "light" is intended to include all such other forms of radiation.

The invention is also not limited by the type of object being studied. The test object can be made of any material, and can include biological tissues and organs.

The lens can be located virtually anywhere in the system. For example, it could be placed between the object and the birefringent material, between the birefringent material and the polarizer, or between the polarizer and the image sensor. Indeed, if the image sensor is a video camera, lens 17 could be the camera lens. Thus, it is understood that the placement of the symbol for the lens, in the figures, is only exemplary, and not limiting. Also, the lens can be a simple lens or a compound lens.

Because of the irregular texture of the surface of the object, the interference pattern is of random character. Nevertheless, the random interference pattern acts as an information carrier about the state of deformation of the test object. When the object is deformed, or deformed further from a previous deformed state, the interference pattern is slightly modified. By comparing the interference patterns of the test object in two slightly deformed states, another fringe pattern is obtained which depicts the surface deformation. The latter fringe pattern is sometimes called a secondary fringe pattern. The secondary fringe pattern does not result from direct optical interference; rather, it is the result of a comparison performed by a computer programmed according to one of the algorithms explained later.

The interference patterns must be analyzed by a computer, or an equivalent device. Although it is possible to observe directly, on a video monitor, the individual interference patterns for the two states of deformation, it is only by comparing these two patterns that the information on the difference in the states of deformation of the object will be revealed. This comparison cannot normally be done by the eye alone.

Apart from the need for a computer to observe the interference patterns, the computer is also useful for purposes of storing many images, or selected images, for later processing.

It is understood that, in the context of this invention, the term "computer" may include many types of devices, including different types of microprocessors having varying amounts of memory capacity. The term is also intended to include any device capable of performing comparisons between pairs of images.

Thus, the operation of the invention can be summarized as follows. A coherent or partially coherent light beam is directed onto the test object, and an interference pattern is observed and/or recorded. Then, the object is stressed, such as by applying heat, pressure, vibrational excitation, or any other means of applying stress. Another interference pattern is obtained. Comparison of the interference patterns, for the stressed and unstressed conditions, yields information about the integrity of the test object. Note that the initial condition of the object may be one of stress, and that the interference pattern may be obtained by applying further stress. The invention compares the patterns obtained for two distinct conditions of stress, one of which may be the special case of zero stress.

Figure 5:
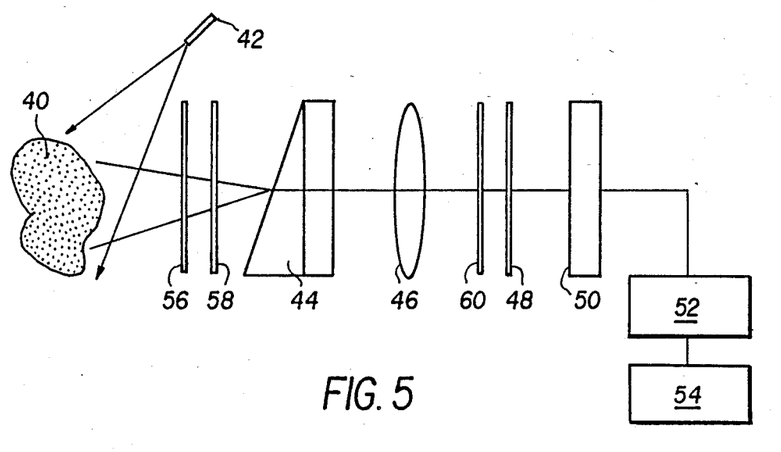
FIG. 5 is a schematic diagram of another embodiment of the present invention, wherein the phase of the interference pattern can be precisely controlled.

FIG. 5 shows an alternative embodiment of the invention. Light from source 42 is reflected from test object 40, and directed through birefringent material 44, lens 46, and polarizer 48. The image is received by image sensor 50, connected to computer 52 and display device 54. As before, the term "light" is used to mean any form of radiation which is capable of interference, and the lens can be placed anywhere between the object and the image sensor. All of the components discussed so far are similar to those shown in FIG. 4. The embodiment of FIG. 5 also includes band-pass optical filter 56, quarter-wave plate 58, and quarter-wave plate 60.

Band-pass filter 56 is chosen to pass only the frequency of the coherent light of the illumination, reflected from the object. Virtually all ambient light is rejected. Thus, use of the filter enables the apparatus to operate where the ambient light is very intense, even in sunshine.

Quarter-wave plate 58 is useful in the case where the light reflected from the object is linearly polarized. In the latter case, the principal axes of the birefringent material would need to be oriented by 45° to the plane of polarization of the reflected beams, in order to insure that the two beams exiting the birefringent material are of nearly equal intensity. Quarter-wave plate 58, placed before the birefringent material, makes the incident beam circularly polarized, and insures that the intensities of the components transmitted by the birefringent material will be nearly equal. Quarter-wave plate 58 thus avoids the need for a particular orientation of the birefringent material.

Quarter-wave plate 60 operates in conjunction with polarizer 48 to control the phase of the interference pattern. A complete discussion of the function of quarter-wave plate 60 will be given later.

The band-pass filter, the first quarter-wave plate 58, and the second quarter-wave plate 60, shown in FIG. 5, are all optional. Moreover, these three components work independently, and any combination of them may be used. The band-pass filter can be placed anywhere between the object and the image sensor. If quarter-wave plate 58 is used, it should be placed between the object and the birefringent material. Quarter-wave plate 60, if used, must be located between the birefringent material and the image sensor.

The interference patterns produced by the apparatus of either of FIGS. 4 or 5 can be analyzed by the following technique. Let the wavefronts of the sheared images received by the image sensor be given by $$\mu(x,y) = ae^{\theta(x,y)} \tag{6a}$$

and $$\mu(x+\delta x, y) = ae^{\theta(x+\delta x, y)} \tag{6b}$$

where $\theta(x,y)$ and $\theta(x+\delta x, y)$ represent the phase of the light from a point $P(x,y)$ and a neighboring point $P(x+\delta x, y)$, respectively, and a is the amplitude of the light. The amplitude is assumed to be equal for the two neighboring points.

The total light amplitude $U_T$ received by the image sensor is thus $$U_T = \mu(x,y) + \mu(x+\delta x, y) \tag{7}$$

and the intensity $I_u$ of the image is $$I_u = U_T U_T^* = 2a^2[1 + \cos\phi] \tag{8}$$

where $\phi = \theta(x,y) - \theta(x+\delta x, y)$ represents a random phase angle. The phase angle $\phi$ is random because the object surface is generally optically rough, and its surface depth variation is irregular. $I_u$ represents an image of the object, modulated by a random interference pattern (RIP) due to the random phase angle.

When the object is deformed, the surface displacements cause a change in the optical path. This optical path change produces a relative phase change between the two sheared wavefronts, and the RIP is slightly modified. Thus, Equation (8) becomes $$I_d = 2a^2[1 + \cos(\phi + \Delta)] \tag{9}$$

where $I_d$ is the intensity distribution after deformation, and $\Delta$ is the relative phase change due to relative displacement between the points $P(x,y)$ and $P(x+\delta x, y)$. The relationship between the relative phase change and the relative displacements will be described later.

To generate the fringe pattern which illustrates the condition of the test object, $I_u$ is first digitized and stored in a computer memory. Then, the object is deformed, or deformed further from an initial deformed state, and the deformed image $I_d$ is also digitized and stored. $I_u$ and $I_d$ are compared by any one of the following techniques, performed by a computer or its equivalent:

1. Subtraction

This is the simplest technique for analyzing the test object. The computer determines a resultant intensity distribution I, where $I = I_d - I_u$, or $$I = 2a^2[\cos(\phi + \Delta) - \cos\phi] \tag{10}$$

The intensity distribution shown in Equation (10) represents a secondary interference pattern depicting $\Delta$, which is related to the deformation. This fringe pattern can be displayed on a monitor, by the computer, and can be interpreted directly with the naked eye. Equation (10) shows a fringe pattern having dark lines where $\Delta = N\pi$, where N is an even integer, and having bright lines where $\Delta = N\pi$, where N is an odd integer.

2. Addition

The computer can be programmed to calculate the sum of $I_d$ and $I_u$. The result is $$I = 2a^2[2 + \cos(\phi + \Delta) + \cos\phi] \tag{11}$$

Equation (11) shows that there is a fringe pattern with darker lines for $\Delta = N\pi$, where N is an odd integer, and brighter lines for $\Delta = N\pi$, where N is an even integer.

The pattern obtained from addition of $I_u$ and $I_d$ is not as easy to observe as the pattern obtained from subtraction, because even the "dark" lines are relatively bright. However, if the computer is programmed to subtract away the constant term in Equation (11), the result can be made easily visible. Other image enhancement techniques may also be used to increase further the contrast of the fringe pattern.

3. Multiplication

In this case, the intensity distributions are multiplied together. The result is $$I = 4a^4[\cos \Delta/2 + \cos(\phi - \Delta/2)]^2 \quad (12)$$

Equation (12) defines a pattern having darker fringe lines for $\Delta/2 = N\pi$, where N is an odd half-integer (i.e. $\frac{1}{2}$, 3/2, 5/2, ...), and brighter fringe lines for $\Delta/2 = N\pi$, where N is an integer. As in the case of addition, the pattern represented by Equation (12) is not as easy to observe directly as in the case of subtraction.

4. Division

The quotient of the deformed and non-deformed intensities is given by $$I = \frac{I_d}{I_u} = \left[\cos \frac{\Delta}{2} + \tan \frac{\phi}{2} \sin \frac{\Delta}{2}\right]^2 \quad (13)$$

Equation (13) defines a fringe pattern having dark lines for $\Delta/2 = N\pi$, where N is an integer. Bright fringe lines occur when $\Delta/2 = N\pi$, where N is an odd half-integer. The dark lines correspond to the absence of the random interference pattern (RIP), and the bright lines correspond to maximum visibility of the RIP.

The technique of analyzing the object by division, as shown above, enjoys the advantage that it is independent of the illumination and reflectivity of the object. That is, when $I_d$ is divided by $I_u$, the light intensity distribution $a^2$ cancels out, resulting in a uniform image intensity modulated by a fringe pattern. In practice, the illumination and reflectivity may vary from one point of the object to another. By using the division technique, the result is made independent of the illumination and reflectivity. The division technique is especially useful if one needs to obtain a very uniform image, and where one seeks to pseudo-color code the resultant fringe pattern. Color coding aids in the visual identification of anomalies in the fringe pattern. When color coding is used, it is important that the pattern not be disturbed by variations in light intensity along the object.

The relationship between the relative phase change $\Delta$ and the relative displacement is explained in the paper by Hung, cited above.

The cited publication shows that the relative phase change is given by $$\Delta = 2\pi/\lambda(A\delta u + B\delta v + C\delta w) \quad (14)$$

where ($\delta u$, $\delta v$, $\delta w$) is the relative displacement vector between $P(x,y)$ and $P(x+\delta x, y)$. A, B, and C are sensitivity factors which are related to the position of the illumination point $S(x_s, y_s, z_s)$ and the camera lens position $S(x_0, y_0, z_0)$ by:

$$A = \left(\frac{x - x_0}{R_0} + \frac{x - x_s}{R_s}\right) \quad (15a)$$

$$B = \left(\frac{y - y_0}{R_0} + \frac{y - y_s}{R_s}\right) \quad (15b)$$

$$C = \left(\frac{z - z_0}{R_0} + \frac{z - z_s}{R_s}\right) \quad (15c)$$

where $$R_0^2 = x_0^2 + y_0^2 + z_0^2$$
$$R_s^2 = x_s^2 + y_s^2 + z_s^2$$

In the case where the magnitude of shearing is small, the relative displacements, divided by the distance between the points of interest, approximate the derivative of displacement with respect to the direction of shearing. Note that the derivative of displacement is directly related to the strain of the object. Therefore, the present invention is particularly suited to providing a direct indication of strain, without the need for further processing.

In general, Equation (14) has three unknown variables. In order to separate the relative displacements $\delta u$, $\delta v$, and $\delta w$, one must perform the analysis three times, each time with a different camera position and/or illumination point, so as to provide a different set of coefficients A, B, and C. One then obtains three simultaneous equations with three unknowns. Thus, in the three-dimensional case, six exposures are required to determine the strain vector (two exposures for each measurement of $\Delta$). The quantities A, B, and C, can be treated as constants for a given point (x,y,z). That is, A, B, and C are independent of the strain on the object. Of course, A, B, and C are functions of x, y, and z, and must be recomputed when it is desired to analyze the strain at another point.

The invention is also applicable to the measurement of the relative displacements in a test object which is undergoing steady-state vibration. Since in a steadily vibrating object, the object spends most of its time near the two extreme positions (the positions of maximum amplitude of vibration), the fringe pattern obtained depicts the maximum relative displacements of the vibrating object. The pattern obtained is, in effect, a time-averaged pattern, and it is a bit blurred compared to the patterns obtained for a non-vibrating object. But it is still possible to observe fringes.

The invention is also applicable to the measurement of transient relative displacements in the test object, such as those induced by impact. In this case, a pulsed laser which emits a radiation pulse of very short duration (e.g. of the order of 20 nanoseconds) is needed to capture this transient deformation. In one such procedure, one first directs a first pulse at the object, and records the interference pattern. One then strikes the object, and then directs a second pulse at the object. The two patterns are compared as before. In the latter procedure, it is assumed that the laser is charged separately for the two pulses. It is also possible to direct a steady train of laser pulses, having a temporal separation of the order of about 1 msec, and to record the images obtained from each pulse.

As stated above, the quarter-wave plate 60 is used, together with polarizer 48, to adjust the phase of the interference pattern. Phase shifting is important in cases where it is necessary to analyze the fringe pattern very precisely. Due to irregularities in the pattern, it is usually not possible to identify precisely the gradations of brightness of portions of the fringes. The only portions of the fringes which can be identified with great precision are the brightest or darkest regions, i.e. the maxima and minima. Phase shifting of the pattern makes it possible to insure that a point of interest, on the image plane, will have a maximum or minimum level of brightness. The amount of phase shift can then be used to infer the relative displacement between the two points of interest on the object, thus providing information on strain.

Figure 6:
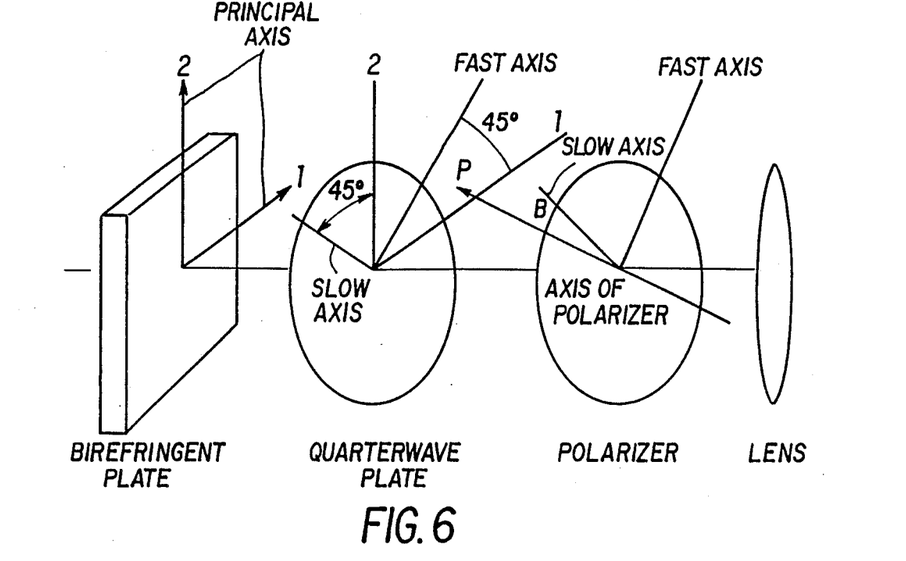
FIG. 6 is a diagram illustrating the polarization of a beam of light traveling from a birefringent material, through a quarter-wave plate, and through a polarizer.
Figure 7:
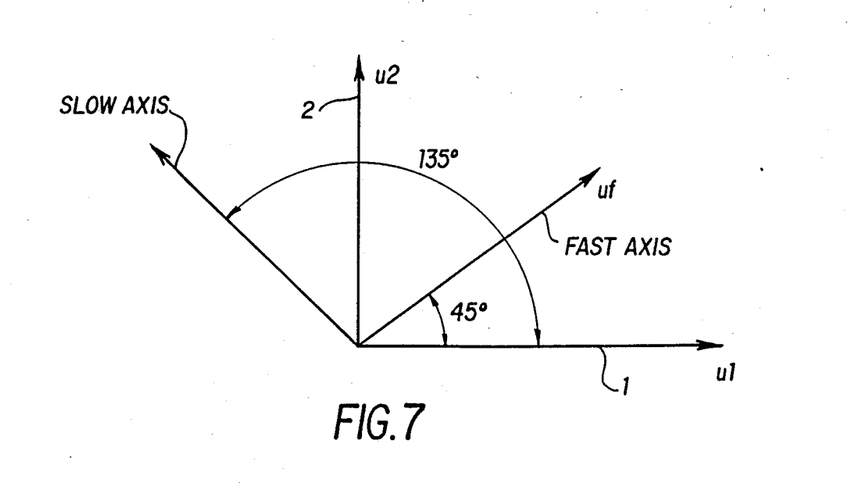
FIG. 7 is a diagram illustrating the action of the quarter-wave plate used in the invention.
Figure 8:
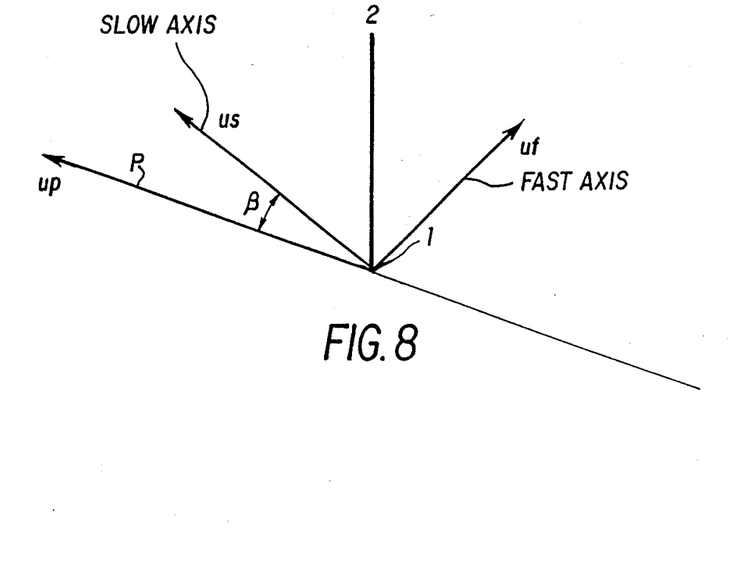
FIG. 8 is a diagram illustrating the action of the polarizer used to control the phase of the interference pattern, in the present invention.

The theory underlying the controlled phase shifting is explained with the aid of FIGS. 6, 7, and 8. FIG. 6 schematically illustrates the birefringent material, the quarter-wave plate 60, and the polarizer. A quarter-wave plate is a material which has two axes of transmission, and which converts an incident beam into two orthogonally-polarized beams, wherein there is a phase difference of 90° (i.e. one quarter-wave) between the two beams. Quarter-wave plates are commercially available. The axes of polarization by a quarter-wave plate are known as the "fast" axis and the "slow" axis. The terms "fast" and "slow" refer only to the fact that the phase of one of the transmitted beams lags that of the other transmitted beam.

For best results, the fast axis of the quarter-wave plate of FIG. 6 is oriented at 45° with respect to the principal axis "1" of the birefringent material, or "plate". Other orientations can be used, but the results will not be optimal.

Assume that the wavefronts transmitted through the principal axes "1" and "2" of the birefringent plate are $u_1$ and $u_2$, respectively, where $u_1$ represents light originating from the object point $P(x,y)$ and $u_2$ originates from neighboring point $P(x+\delta x, y)$. The two wavefronts may be represented by $$\mu_1(x,y) = a \cos \omega t \quad (16a)$$

and $$\mu_2(x+\delta x, y) = a \cos(\omega t - \phi) \quad (16b)$$

where a is the amplitude of the light, $\omega$ is the angular velocity of the light wave, t is time, and $\phi = \theta(x+\delta x, y) - \theta(x,y)$ is a random phase angle representing the relative phase difference between two neighboring points.

The wavefronts emerging from the quarter-wave plate, whose fast axis is oriented at 45° to the principal axis "1" are obtained by resolving the components of $u_1$ and $u_2$ which lie parallel to the fast axis. FIG. 7 illustrates this resolution. The wavefront uf emerging from the fast axis is $$u_f = u_1 \cos 45° + u_2 \cos 45° = \frac{a}{\sqrt{2}} [\cos \omega t + \cos(\omega t - \phi)] \quad (17)$$

The wavefront us emerging from the slow axis is retarded by $\pi/2$, relative to the wavefront transmitted through the fast axis. Thus, $$u_s = a \cos\left(-\phi - \frac{\pi}{2}\right) \cos 45° + \quad (18)$$

$$a \cos\left(\omega t - \frac{\pi}{2}\right) u \ldots 35°$$

$$= \frac{a}{\sqrt{2}} (\sin(\omega t - \phi) - \sin \omega t)$$

Now, consider the effect of the polarizer. Assume that the polarizer is oriented so that its polarizing axis is oriented at an angle $\beta$ to the slow axis. The wavefront transmitted through the polarizer is obtained by resolving the components of uf and us along the polarizing axis, as shown in FIG. 8. The wavefront $u_p$ transmitted through the polarizer is thus $$u_p = u_s \cos \beta - u_f \sin \beta = \quad (19)$$

$$\frac{a}{\sqrt{2}} (\sin(\omega t - \phi) - \sin \omega t) \cos \beta -$$

$$\frac{a}{\sqrt{2}} (\cos \omega t + \cos(\omega t - \phi)) \sin \beta$$

$$= -\sqrt{2} \, a \sin\left(\frac{\phi}{2} + \beta\right) \cos\left(\omega t - \frac{\phi}{2}\right)$$

Thus, the intensity of the transmitted wave is $$I_p = 2a^2 \sin^2\left(\frac{\phi}{2} + \beta\right) \quad (20)$$

Equation (20) shows that a phase shift $\beta$ is introduced between the two wavefronts derived from the two neighboring points $P(x,y)$ and $P(x+\delta x, y)$. The amount of phase shift is controlled simply by adjusting the orientation angle $\delta$ of the polarizer.

Note that the ability to control the phase of the interference pattern depends not only on the presence of quarter-wave plate 60 and the polarizer, but also on the birefringent material. It is the birefringent material which provides the two orthogonally-polarized beams entering the quarter-wave plate. With shearing techniques of the prior art, such as the wedge-shearing method, it is not possible to control the phase of the final pattern.

Knowledge of the phase of the interference pattern is a powerful tool. For example, it converts the apparatus of the present invention into an ultra-sensitive strain gauge. A method for measuring strain near a given point on the object is as follows. First, from a knowledge of the geometry of the arrangement, including the position of the birefringent material, the computer calculates the position, on the image plane, corresponding to the given point on the object. The object is illuminated, and a first fringe pattern is recorded and stored by the computer. Then, the object is deformed. While the object is in its deformed state, the computer continually samples the fringe pattern produced, and compares each such pattern with the pattern originally stored, to produce a secondary fringe pattern (using one of the algorithms discussed above). Meanwhile, the orientation of the polarizer is adjusted (either manually or automatically) until the secondary fringe pattern yields a maximum or minimum on the point of interest on the image. The value of $\beta$ in Equation (20) is known directly, from the orientation of the polarizer.

Assume now that the algorithm used to generate the secondary fringe pattern is subtraction. It has been observed that bright lines on the secondary fringe pattern occur for $\Delta = N\pi$, where N is an odd integer. Comparison of Equation (20) with Equation (9) shows that the effect of the phase shift is to add $2\beta$ to $\Delta$, in Equation (9). This means that the condition for a maximum is $\Delta + 2\beta = N\pi$, where N is an odd integer.

It is possible to calculate N directly, by observing the fringe pattern, and counting the number of fringes from the boundary of the pattern to the point of interest.

From a knowledge of N, and a knowledge of $\beta$, one can readily calculate $\Delta$. Then, using Equation (14), one can calculate the relative displacements. A similar technique can be used if the comparison algorithm is other than the subtraction method.

The present invention provides significant advantages over the interferometric techniques of the prior art. Unlike the wedge-shearing technique described above, the present invention can be used with a video camera, a charge-coupled device, or equivalent, and does not require high-resolution photographic film. The invention therefore eliminates the cost of the film, and eliminates the time required for developing the film. Moreover, unlike the wedge-shearing process, the present invention does not require subsequent optical filtering to make the interference patterns visible. Thus, with the present invention, objects can be tested at a video rate. As many as about 30 images per second can be recorded. The present invention therefore provides a means for testing in "real time", and thus can be operated at a speed sufficient to fulfill the demands of a typical production line. Since the data are analyzed, in the first instance, by computer, it is very easy to store all or some of the incoming data, for further analysis.

As explained above, the present invention permits the precise measurement of strains, due to the ability to adjust the phase of the interference pattern. The prior art does not have this advantage. Unlike conventional strain gauges of the prior art, which are mounted only at one point of interest, and which give information only about that point, the strain gauge of the present invention can analyze any point on the object without the need to adjust the position of a sensor. The system analyzes the strain at a given point by computer analysis of the images produced, without moving a physical component.

Another advantage of the present invention is that it does not requires a high-power light source. This advantage is due to the fact that a video camera, or equivalent electronic device, is much more sensitive than a high-resolution photographic emulsion. A video camera equipped with an image intensifier allows illumination of the test object with light of extremely low intensity. Moreover, the invention uses a wide aperture lens, With an f number as low as 1.2, or even lower, further enabling the light from the source to be used most efficiently. The use of a low-power laser is advantageous not only because it is less expensive, but also because it avoids the safety problems associated with high-power lasers.

The present invention also enjoys significant advantages over the technique of electronic speckle pattern interferometry (ESPI). The present invention requires only one beam, not two; no reference beam is needed. There is thus no optical alignment problem as is present in ESPI. It is also not necessary to adjust the ratio of intensities of the object and reference beams. And because there is no reference beam, the present invention does not require special vibration isolation precautions, thus allowing the technique to be employed in a production or field environment. To the extent that the test object is a rigid body, the interference pattern formed by the sheared images will be generally insensitive to slight movements of the equipment.

With the present invention, the coherent length requirement of the beam is relatively low. In the case of holography or ESPI, the original beam is split into two beams before the object is illuminated, requiring the matching of the path lengths of the object beam and the reference beam. In the present invention, the path lengths are automatically matched; they originate from two nearby points on the object. Thus, it is not necessary to use a relatively expensive, single-mode laser having a long coherence length. Indeed, it is possible to practice the invention without a laser at all, as long as the radiation used is reasonably coherent. The degree of coherence required depends, in part, on the amount of ambient light. If the ambient light is very strong, the requirement of coherence is greater.

The present invention is particularly useful in nondestructive testing because it directly measures strains in the test object. Premature failures in defective components are usually due to stresses caused by the defects. These stresses are directly related to strains, which are observed directly.

While the invention has been described with respect to a specific embodiment, it is understood that the invention can be varied. The invention is not limited to a particular type of birefringent material, nor is it limited to particular means of assembly of the optical components. The birefringent material may conveniently be mounted on the lens, but it may also be distinct from the lens. In certain cases, it may even be possible to eliminate the lens entirely. Also, the concept of the invention is not limited to the use of birefringent materials, but should be interpreted to include any other means, or material, for transforming a pair of non-parallel beams, from distinct points on an object, into a pair of nearly parallel, interfering beams. The invention is also not limited by the type of computer employed. These and other similar modifications should be considered within the spirit and scope of the following claims.

What is claimed is:

1. A method for nondestructively analyzing a test object, comprising the steps of:
   (a) directing coherent radiation onto a test object,
   (b) passing radiation reflected from the object through a birefringent material and then through a polarizer,
   (c) directing radiation emerging from the polarizer onto a detector, the birefringent material and the polarizer cooperating to form a random interference pattern on the detector, and storing the random interference pattern thus formed,
   (d) stressing the object, and repeating steps (a), (b), and (c) while the object is stressed, and
   (e) electronically comparing the random interference patterns formed while the object is in the stressed and unstressed conditions.

2. The method of claim 1, further comprising the step of displaying a fringe pattern, the fringe pattern being generated as a result of the comparing step, and wherein the comparing step is performed without optical interference between the random interference patterns.

3. The method of claim 1, wherein the object is continuously vibrating.

4. The method of claim 1, wherein the comparing step comprises the step of computing the difference of the intensities of each point of the respective random interference patterns.

5. The method of claim 1, wherein the comparing step comprises the step of computing the sum of the intensities of each point of the respective random interference patterns.

6. The method of claim 1, wherein the comparing step comprises the step of computing the product of the intensities of each point of the respective random interference patterns.

7. The method of claim 1, wherein the comparing step comprises the step of computing the quotient of the intensities of each point of the respective random interference patterns.

8. A method for nondestructively analyzing a test object, comprising the steps of:
  (a) directing light onto a test object,
  (b) passing light reflected from the object through a birefringent material and then through a polarizer,
  (c) directing light emerging from the polarizer onto a video camera, the birefringent material and the polarizer cooperating to form a random interference pattern in the camera, and storing the random interference pattern thus formed,
  (d) stressing the object, and repeating steps (a), (b), and (c) while the object is stressed, and
  (e) electronically and non-optically comparing the random interference patterns formed while the object is in the stressed and unstressed conditions.

9. The method of claim 8, wherein the comparing step comprises the step of computing the difference of the intensities of each point of the respective random interference patterns.

10. The method of claim 8, wherein the comparing step comprises the step of computing the sum of the intensities of each point of the respective random interference patterns.

11. The method of claim 8, wherein the comparing step comprises the step of computing the product of the intensities of each point of the respective random interference patterns.

12. The method of claim 8, wherein the comparing step comprises the step of computing the quotient of the intensities of each point of the respective random interference patterns.

13. Apparatus for nondestructive analysis of a test object, comprising:
  (a) a source of coherent radiation, positioned to direct radiation onto the object so that the radiation is reflected from the object,
  (b) a birefringent material, disposed to receive radiation reflected from the object,
  (c) a polarizer, disposed to receive radiation emerging from the birefringent material,
  (d) image detection means, disposed to receive radiation leaving the polarizing means, the birefringent material and the polarizer cooperating to form a random interference pattern at the detection means,
  (e) image processing means, the image processing means being programmed to store at least one pair of random interference patterns, and to compare said patterns electronically.

14. The apparatus of claim 13, wherein the image detection means comprises a video camera.

15. The apparatus of claim 14, wherein the image processing means includes a computer, and wherein the computer is programmed to store and process a plurality of images received by the camera.

16. The apparatus of claim 13, further comprising a quarter-wave plate disposed between the test object and the birefringent material.

17. The apparatus of claim 13, further comprising an optical band-pass filter disposed between the test object and the birefringent material.

18. The apparatus of claim 13, further comprising a quarter-wave plate disposed between the birefringent material and the image detection means, so as to receive radiation leaving the birefringent material, and wherein the orientation of the polarizer is adjustable.

19. The apparatus of claim 13, further comprising a wide-aperture lens, the lens being disposed between the object and the detection means.

* * * * *